ABSTRACT# United States Patent [19]

Briar

[11] 3,752,279
[45] Aug. 14, 1973

[54] ELECTROMAGNETIC CLUTCH
[75] Inventor: John R. Briar, Dayton, Ohio
[73] Assignee: General Motors Corporation, Detroit, Mich.
[22] Filed: Mar. 20, 1972
[21] Appl. No.: 236,021

[52] U.S. Cl.................. 192/84 C, 192/106.1, 64/14
[51] Int. Cl............................ F16d 27/10, F16d 3/12
[58] Field of Search...................... 192/84 C, 106.1; 64/14

[56] References Cited
UNITED STATES PATENTS

| | | | |
|---|---|---|---|
| 3,565,223 | 2/1971 | Pierce | 192/84 C |
| 3,662,568 | 5/1972 | Kashima et al. | 64/14 X |
| 2,796,962 | 6/1957 | Pierce | 192/84 C |
| 3,205,989 | 9/1965 | Mantey | 192/84 C |
| 3,425,529 | 2/1969 | Hayashi | 192/84 C |

*Primary Examiner*—Allan D. Herrmann
*Attorney*—Warren E. Finken, John P. Moran et al.

[57] ABSTRACT

The drawings illustrate an electromagnetic clutch including torque dampener means having portions thereof compressed during operation between driving and driven elements, the driven element being secured through a hub member to an output shaft, and the driving element being engageable with an input rotor upon energization of a coil and mounted on the output shaft so as to be axially located thereon and yet rotatable thereon to the extent of any operational compression or expansion of the torque dampener means.

5 Claims, 3 Drawing Figures

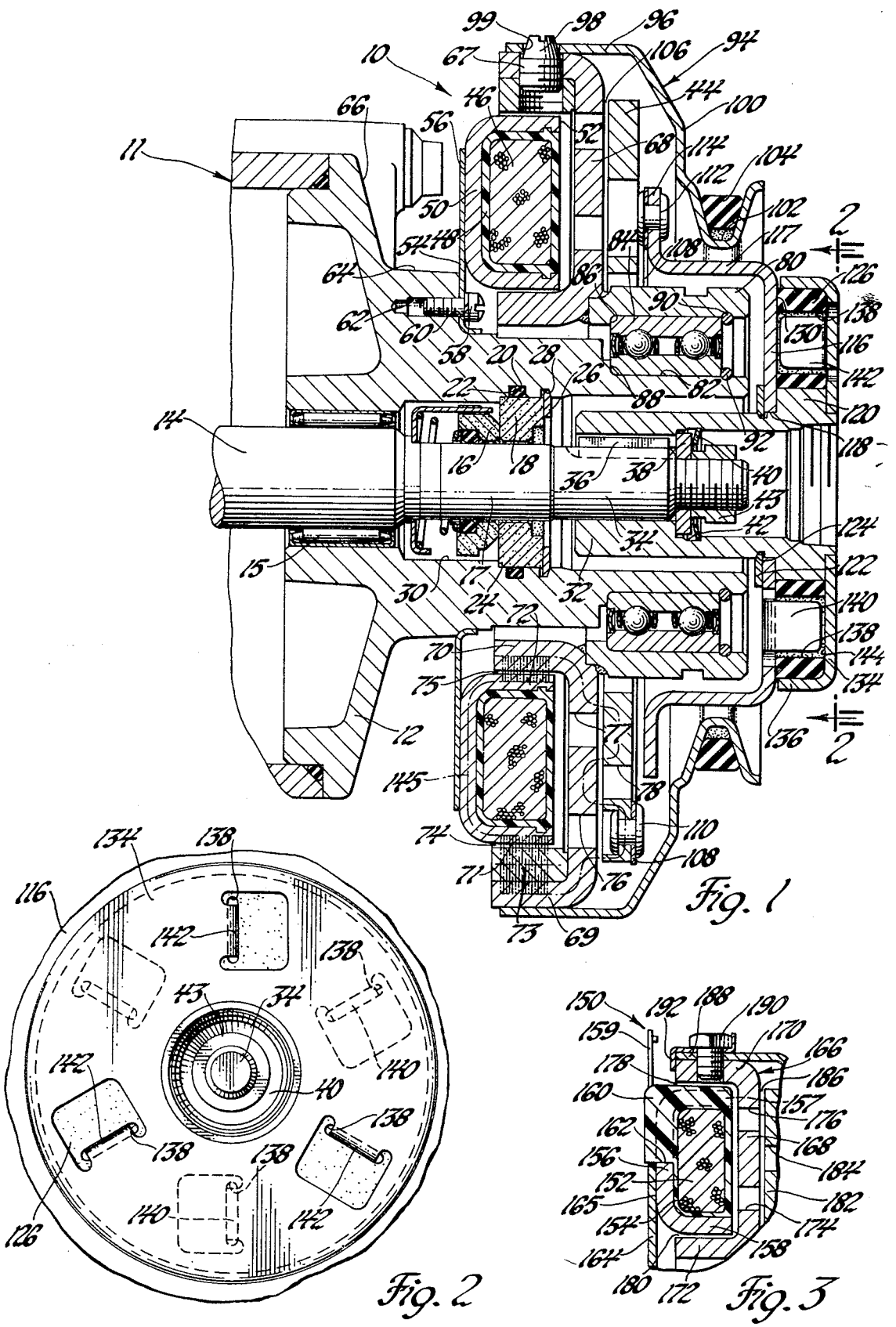

3,752,279

ELECTROMAGNETIC CLUTCH

This invention relates generally to electromagnetic clutches and, more particularly, to means associated with such clutches for preventing damage to the clutch and to the devices connected by the clutch.

Electromagnetic clutches and the devices connected by the electromagnetic clutches are apt to be subjected to many destructive operational torque pulses and/or vibrations of various types which can be extremely destructive at resonant frequencies. Should the shaft connected to the clutch be driven for extended periods under torsional vibration at resonant frequencies, breakage thereof may occur relatively quickly. Furthermore, since electromagnetic clutches engage quickly and suddenly, there is a sharp shock to the clutch and also to the devices connected by the clutch.

An object of the invention is to provide improved simple, inexpensive means for preventing damage to electromagnetic clutches and the devices connected by them.

Another object of the invention is to provide improved simple, inexpensive elastomeric connection means in an electromagnetic clutch for preventing destructive vibrations and shock to the clutch and to the devices connected by the clutch.

A further object of the invention is to provide torque dampener means for an electromagnetic clutch, wherein the torque dampener means includes an elastomeric ring having radial slots formed therein for alternate mounting on tabs formed on relatively rotatable driving and driven elements such that portions of the elastomeric ring are compressed between respective adjacent driving and driven element tabs.

These and other objects and advantages of the invention will be apparent when reference is made to the following description and accompanying drawings, wherein:

FIG. 1 is a cross-sectional view illustrating an electromagnetic clutch embodying the invention;

FIG. 2 is a fragmentary end view taken along the plane of line 2—2 of FIG. 1, as if FIG. 1 were a full-round view, and looking in the direction of the arrows; and FIG. 3 is a fragmentary cross-sectional view of an alternate embodiment of a portion of the FIG. 1 structure.

Referring now to the drawings in greater detail, FIG. 1 illustrates an electromagnetic clutch 10 suitable for driving a refrigerant compressor 11, on the forward end of which is formed a tubular extension 12. An output shaft 14 for driving the compressor 11 is rotatably mounted on needle bearings 15, extending outwardly through the tubular extension 12. A rotating shaft seal 16 is mounted around a reduced intermediate portion 17 of the shaft 14. The shaft seal 16 is in sealing engagement with a stationary seal ring 18, the latter being sealed to the tubular extension 12 by an O-ring-type seal ring 20 mounted in a groove 22 formed in the tubular extension 12. The seal ring 18 is confined axially between a shoulder 24 formed within the tubular extension 12 and a split locking ring 26 mounted in a groove 28 formed in the tubular extension 12. The inner bore of the tubular extension 12 is enlarged at 30 to facilitate assembly and removal of the locking ring 26, the stationary seal ring 18, and the rotating part of the shaft seal 16.

The enlarged inner bore 30 of the tubular extension 12 provides space for the accommodation of the greater portion of a hub 32 which is mounted upon a reduced end portion 34 of the shaft 14. The hub 32 is keyed to the output shaft 14 by a suitable key 36 and is held on the end portion 34 of the shaft 14 by a washer 38 and a lock washer 40, the washer 38 and the lock washer 40 being confined in a stepped annular groove 42 formed within the hub 32 by a nut 43 threadedly mounted on the shaft end 34.

For attracting an armature plate 44, there is provided an annular electromagnetic coil 46, of a predetermined number of turns, surrounding the tubular extension 12. The coil 46 is embedded within a suitable resin 48, such as epoxy or nylon or polyester resin, which is cast within an annular coil housing 50. The coil housing 50 has an open side 52 facing the armature plate 44 and is formed of paramagnetic material, such as steel or malleable iron. A connector plate 54 is mounted around the tubular extension 12 and secured in any suitable manner to the closed side 56 of the coil housing 50. A plurality of bolts 58 are mounted through openings 60 formed in the plate 54 and inserted into threaded openings 62 formed in bosses 64 on the adjacent forward wall 66 of the compressor 11.

An annular pole member or clutch rotor 68 is mounted intermediate the coil housing 50 and the armature plate 44, with concentric axially extending respective outer and inner wall portions 69 and 70 extending past the outer and inner walls 71 and 72, respectively, of the coil housing 50. A locking ring member 73 is secured against the inner surface of the outer wall portion 69 by bolts 67, a spaced cylindrical gap 74 width apart from the outer wall 71 of the coil housing 50. A second cylindrical gap 75 separates the inner wall portion 70 and the inner wall 72 of the coil housing 50.

A pulley assembly 94 is formed of sheet metal and includes a cylindrical outer portion 96 locked in place on the outer axially extending wall portion 69 of the rotor 68 by virtue of a tapered head 98 on each bolt 67 being turned radially outwardly into locking contact with openings 99 formed in the cylindrical outer portion 96 of the pulley assembly 94. The latter assembly further includes an inwardly extending wall portion 100, and a pulley groove 102 formed on the radial inner portion of the wall portion 100. An engine-driven belt 104 is mounted in the pulley groove 102.

Respective outer and inner arcuate-shaped annular spaces or passages 76 and 77 are formed in the rotor 68 adjacent the coil 46 and the open side-face 52 of the coil housing 50. An additional set of arcuate-shaped annular spaces or passages 78 are formed in the armature plate 44, radially intermediate the annular spaces 76 and 77.

A sleeve member 80 is rotatably mounted around a reduced outer diameter portion 82 of the tubular extension 12 on bearings 84, the bearings 84 being axially confined at one end thereof by shoulders 86 and 88 formed on the sleeve member 80 and the reduced tubular extension 82, respectively, and at the other end thereof by locking rings 90 and 92 mounted in grooves formed in the respective members 80 and 82. The sleeve member 80 is secured at one end thereof by any suitable means, such as welding, to the adjacent inner axially extending wall portion 70 of the rotor 68.

The armature plate 44 is positioned a minimal radial gap 106 width away from the adjacent face of the rotor 68 when the coil is deenergized, and otherwise freely mounted around the sleeve member 80, being held in this location by a plurality of leaf springs 108, each being secured by rivets 110 at the radially outer end thereof to the armature plate 44 and at the radially inner end thereof by rivets 112 to a flange 114 formed on a support member or drive cup 116. A cylindrical wall portion 117 of the drive cup 116 extends axially intermediate the pulley groove 102 and the sleeve member 80. A central opening 118 is formed in the drive cup 116 and mounted around the hub 32, the drive cup 116 being secured against axial movement between a shoulder 120 formed on the outer end of the hub 32 and a retainer ring 122 mounted in an annular groove 124 formed on the hub 32, but able to be rotated therebetween with respect to the hub 32.

An elastomeric ring or torque-cushion 126 is mounted axially between, but not secured to, the outer face 130 of the drive cup 116, and a cushion housing or cover member 134 which is welded to the outer end of the hub 32. The torque-cushion 126 is mounted radially between the outer surface of the hub shoulder 120 and a cylindrical flange 136 formed on the radial outer portion of the cover member 134.

A plurality of equally spaced radial slots 138 are formed in the torque-cushion 126. A first plurality of tabs 140 are formed in any suitable manner on the outer face 130 of the drive cup 116, such as by being pressed out of the wall of the drive cup. The tabs 140 are positioned radially with respect to the axis of the shaft 14, and axial with respect to the torque-cushion 126, extending into every other one of the slots 138. A second plurality of oppositely disposed tabs 142 are formed on the inner face 144 of the cover member 134, such as by being pressed out of the wall of the cover member 134. The tabs 142, like the tabs 140, are positioned radially with respect to the axis of the shaft 14, and axially with respect to the torque-cushion 126, extending into the remaining alternate slots 138.

Under the torque-dampening arrangement just described, it may be noted that the rubber torque-cushion 126 is in compression between respective pairs of tabs 140 and 142 under all operating conditions and, as such, would not tear apart and result in related components becoming damaged.

OPERATION

In operation, the clutch 10 is engaged by the energization of the electromagnetic coil 46 which causes magnetic flux to traverse a path through the adjacent paramagnetic materials, as indicated by the dot-dash line 145 (FIG. 1). More specifically, the path of the flux is primarily from the coil 46 to the adjacent walls 72, 56, and 71 of the coil housing 50, and thence across the cylindrical gap 74 into the ring 73 and the outer wall portion 69 of the rotor 68.

The flux next traverses a serpentine path through the four-pole clutch field resulting from the spaced relationship of the alternately located cooperating arcuate slots 76, 78, and 77 formed in the rotor 68 and the armature plate 44. More specifically, the flux crosses the adjacent radial gap 106 from the outer cylindrical wall portion 69 and the radial outer portion of the rotor 68 to enter the radial outer portion of the armature plate 44, from whence it once again crosses the radially extending gap 106 to a mid-portion of the magnetic rotor 68. Then, the flux alternately crosses the gap 106 to the inner portion of the armature plate 44 and thence back across the gap 106 to the inner portion of the magnetic pole member 68 and the radial inner cylindrical wall portion 70 of the rotor 68, prior to crossing the cylindrical gap 75 to complete the circuit to the inner wall 72 of the adjacent coil housing 50.

This arrangement provides a strong, four-pole magnetic clutch field between the armature plate 44 and the rotor 68, resulting in a face-to-face engagement between the armature plate 44 and the rotor 68, against the force of the springs 108 which, via the drive cup 116, the torque-cushion 126, and the cover member 134, efficiently rotate the hub 32 and, thence, the output shaft 14 to thus drive the compressor 11.

Any shock sustained by any of the components between the rotor 68 and the output shaft 14, as a result of the engagement of the initially stationary armature plate 44 with the continuously rotating rotor 68, is absorbed by the elastomeric torque-cushion 126. The torque-cushion 126 also removes any shock or torque pulses emanating from the compressor 11 to the shaft 14. Should the belt 104 and the pulley 94 drive the shaft 14 at a speed which would tend to set up torsional vibrations in the shaft 14, such torsional vibrations will also be damped by the torque-cushion 126 and prevented from becoming destructive. The components housing the torque-cushion 126 are arranged so as to be readily accessible and easily removed for any necessary repair or replacement.

When the coil 46 is deenergized, nulling the magnetic attraction across the variable-width gap 106, the springs 108 will pull the armature plate 44 away from the rotor 68, through the maximum width of the gap 106.

An alternate simplified coil housing assembly 150, not including the locking features of the elements 67, 69, 73, 96, 98, and 99 of FIG. 1, is illustrated in FIG. 3. The assembly 150 includes an annular electromagnetic coil 152 embedded within a suitable resin 154, which is cast within an annular coil housing 156, the latter having respective outer and inner walls 157 and 158. A terminal 159 is integrally cast in a heavy resin portion 160 extending through a cut-out 162 formed in the coil housing 156. A connector plate 164 is secured to the closed side 165 of the coil housing 156 for connection to a compressor housing (not shown). A clutch rotor 166 includes a radially extending portion 168 and respective outer and inner cylindrical portions 170 and 172. Two sets of arcuate slots 174 and 176 are formed in the radial portion 168. Air gaps or spaces 178 and 180 exist between the respective outer and inner walls 157 and 158 of the housing 156 and the respective adjacent outer and inner cylindrical portions 170 and 172 of the rotor 166. An armature plate 182, including arcuate slots 184 formed radially intermediate the slots 174 and 176 of the rotor 166, is spaced a predetermined air gap or space 186 apart from the rotor 166 in the deenergized state. A cylindrical wall portion 188 of a pulley assembly, similar to the pulley assembly 94 of FIG. 1, is secured to the outer portion 170 of the rotor 166 by bolts 190 and an intermediate alignment bracket 192.

It should be apparent that the invention provides an electromagnetic clutch including improved torque dampener means which is under compression, rather than in shear, while the clutch is operative, and which need not be bonded at any of its surfaces to adjacent component surfaces.

While but one principal embodiment of the invention has been shown and described, other modifications thereof are possible.

I claim:

1. An electromagnetic clutch comprising a rotatable driving element, a rotatable driven element, a pole member secured to said rotatable driving element for rotation therewith, electromagnetic means associated with said driving element, an armature plate mounted a predetermined air space apart from said pole member and movable into contact with said pole member by said electromagnetic means, a support member rotatably mounted on said rotatable driven element, spring means secured at one end thereof to said support member and at the other end thereof to said armature plate, a first plurality of equally spaced radially extending tabs formed on said support member, a torque dampener having a plurality of equally spaced radial slots formed therein for mounting on said first plurality of tabs, and a cover member having a second plurality of equally spaced radially extending tabs formed thereon for extension into the remaining alternate radial slots so as to compress alternate portions of said torque dampener between respective adjacent first and second tabs, said cover member being operatively connected to said driven element for rotating said driven element.

2. An electromagnetic clutch comprising an input pulley, an output shaft, a rotor secured to said input pulley for rotation therewith, an armature plate mounted a predetermined air space apart from said rotor, a fixed coil mounted adjacent said rotor for attracting said armature plate to said rotor upon energization of said coil, a drive cup rotatably mounted on said output shaft, a plurality of leaf springs each secured at one end thereof to said drive cup and at the other end thereof to said armature plate, a first plurality of equally spaced radially extending tabs formed on said drive cup, a torque dampener having a plurality of equally spaced radial slots formed therein for mounting on said first plurality of tabs, and a cover member having a second plurality of equally spaced radially extending tabs formed thereon for extension into the remaining alternate radial slots so as to compress alternate portions of said torque dampener between respective adjacent first and second tabs, said cover member being operatively connected to said output shaft for rotating said output shaft.

3. An electromagnetic clutch comprising input means, rotatable output means, a rotor secured to said input means for rotation therewith, an armature plate mounted a predetermined air space apart from said rotor, a coil mounted adjacent said input means for attracting said armature plate into engagement with said rotor upon energization of said coil, a drive cup rotatably mounted and axially fixed on said rotatable output means, a plurality of leaf springs each secured at one end thereof to said drive cup and at the other end thereof to said armature plate, a cover member secured to said output means, a torque dampener mounted without bonding between said drive cup and said cover member, a plurality of equally spaced radial slots formed in said torque dampener, a first plurality of equally spaced radially extending tabs formed on said drive cup and extending into every other one of said slots, and a second plurality of equally spaced radially extending tabs formed on said cover member and extending into the remaining alternate radial slots, thereby compressing the respective intermediate portions of said torque dampener between adjacent first and second tabs.

4. An electromagnetic clutch comprising an input pulley having a pulley groove, a radial wall extending outwardly from said pulley groove, and a cylindrical extension formed on the outer portion of said radial wall, an output shaft, a rotor secured to said cylindrical extension of said input pulley, a fixed coil housing, an annular coil mounted in said coil housing, a first predetermined air space intermediate said coil housing and an outer portion of said rotor, a second predetermined air space intermediate said coil housing and an inner portion of said rotor, an armature plate mounted a third predetermined air space apart from said rotor, a plurality of radial spaced arcuate slots formed on said armature plate and on said rotor providing a multipole clutch field therebetween upon energization of said coil, a drive cup rotatably mounted on said output shaft and retained axially thereon, a plurality of leaf springs each secured at one end thereof to said drive cup and at the other end thereof to said armature plate for permitting said armature plate to move generally axially into frictional engagement with said rotor upon energization of said coil, a hub mounted on said output shaft, a cover member secured to said hub, a torque dampener ring retained axially without bonding between said drive cup and said cover member, a plurality of equally spaced radial slots formed in said torque dampener ring, a first plurality of equally spaced tabs formed on said drive cup and extending into every other one of said radial slots, and a second plurality of tabs formed on said cover member and extending into the remaining alternate radial slots, thereby compressing the respective intermediate portions of said torque dampener ring between adjacent first and second tabs.

5. An electromagnetic clutch comprising an input pulley having a pulley groove, a radial wall extending outwardly from said pulley groove, and a cylindrical extension formed on the outer portion of said radial wall, an output shaft, a radially extending rotor having a first cylindrically extending flange formed thereon and secured to said cylindrical extension of said input pulley, a ring member mounted within said first cylindrically extending flange, a conical-head bolt threadedly mounted in aligned threaded openings formed in said ring member and said first cylindrically extending flange, said conical head serving to lock into an opening formed in said cylindrical pulley extension upon threadedly withdrawing said bolt from said aligned threaded openings, a second cylindrically extending flange formed on said rotor radially inward of said first cylindrically extending flange, a fixed coil housing mounted intermediate said first and second cylindrically extending flanges, an annular coil mounted in said coil housing, a first predetermined air space intermediate said coil housing and said first cylindrically extending flange, a second predetermined air space intermediate said coil housing and said second cylindrically extending flange, an armature plate mounted a third predetermined air space apart from the radially extending portion of said rotor, first and second sets of radially spaced arcuate slots formed on said rotor, a third set of arcuate slots formed on said armature plate intermediate said first and second sets of arcuate slots and providing a multipole clutch field therewith upon energization of said coil, a drive cup rotatably mounted on said output shaft and retained axially thereon, a plurality of leaf springs each secured at one end thereof to said drive cup and at the other end thereof to said armature plate for permitting said armature plate to move generally axially into frictional engagement with said rotor upon energization of said coil, a hub mounted on said output shaft, a cover member secured to said hub, a torque dampener ring retained axially without bonding between said drive cup and said cover member, a plurality of equally spaced radial slots formed in said torque dampener ring, a first plurality of equally spaced tabs formed on said drive cup and extending into every other one of said radial slots, and a second plurality of tabs formed on said cover member and extending into the remaining alternate radial slots, thereby compressing the respective intermediate portions of said torque dampener ring between adjacent first and second tabs.

* * * * *